No. 668,131. Patented Feb. 12, 1901.
H. A. OWEN.
LEVER SCREW FOR HOLDING SPINNING ROLL WEIGHT LEVERS.
(Application filed Dec. 10, 1900.)
(No Model.)

Witnesses.
Thomas L. Drummond
Fred S. Greenleaf

Inventor.
Henry A. Owen,
by Crosby & Gregory
Attys.

UNITED STATES PATENT OFFICE.

HENRY A. OWEN, OF WHITINSVILLE, MASSACHUSETTS, ASSIGNOR TO THE DRAPER COMPANY, OF PORTLAND, MAINE, AND HOPEDALE, MASSACHUSETTS.

LEVER-SCREW FOR HOLDING SPINNING-ROLL WEIGHT-LEVERS.

SPECIFICATION forming part of Letters Patent No. 668,131, dated February 12, 1901.

Application filed December 10, 1900. Serial No. 39,317. (No model.)

*To all whom it may concern:*

Be it known that I, HENRY A. OWEN, a citizen of the United States, and a resident of Whitinsville, county of Worcester, and State of Massachusetts, have invented an Improvement in Lever-Screws for Holding Spinning-Roll Weight-Levers, of which the following description, in connection with the accompanying drawings, is a specification, like letters on the drawings representing like parts.

In United States Patent No. 316,197, dated April 21, 1885, a lever-screw is shown for holding the weight-levers of spinning-machine rolls, the screw therein shown comprising a head for engaging the lever, said head being rotatably connected with a screw-threaded shank which is screwed into a threaded hole tapped into the roller-beam of the spinning-machine. By rotating the shank the head is raised or lowered to effect the desired adjustment of the stirrup-lever, the end of which is in engagement with the rotatable head.

This invention relates to a device of the general character set forth in the patent referred to; and it has for its object an improved lever-screw of simple and cheap construction and which by its use entirely obviates the expensive tapping or screw-threading of the holes in the roller-beam.

Figure 1:
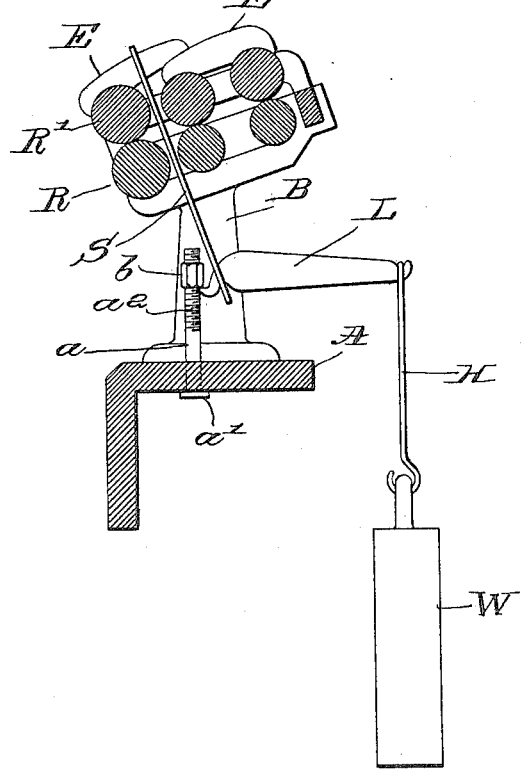
Figure 2:
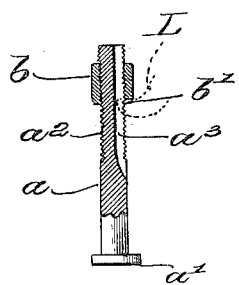
Figures 3, 4:
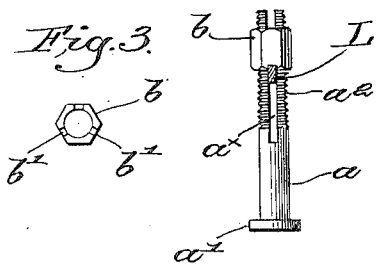

Figure 1 in section represents a sufficient portion of a spinning-frame to illustrate the application of my invention thereto. Fig. 2 is a partly-longitudinal section, on an enlarged scale, of my novel lever-screw with the coöperating lever-holding nut. Fig. 3 is an end view of the nut, showing the locking-notches; and Fig. 4 is a modification of the form of lever-screw to be referred to.

The roller-beam A, roll-stand B, bottom rolls R, top rolls R', saddles E E, stirrup S, lever L, weight-hook H, and weight W to hold down the longer arm of the lever may be and are all as usual.

My novel lever-screw comprises a cylindrical shank $a$, having an annular enlargement or head $a'$ at one end, the other end of the shank being screw-threaded, as at $a^2$, herein shown as extending about half-way the length of the shank. In the threaded portion I have shown a longitudinal recess or groove $a^3$, Fig. 2, which can be readily made by a milling cutter or saw, of a width sufficient to receive the end of the lever L, the sides of the recess presenting two parallel plane faces. A nut $b$ coöperates with the thread on the shank, and the lower end of the nut is shown as provided with locking-notches $b'$, Figs. 2 and 3. Holes are drilled in the roller-beam at the proper places of a size to loosely receive the shanks, the head $a'$ resting against the under side of the beam, and the end of the lever is inserted in the recess $a^3$ below the nut $b$, preventing the shank from turning. The nut is then screwed into proper position and one of the notches $b'$ straddles the top of the lever, as shown in Fig. 2, so that the nut is thereby locked from accidental rotation. Obviously rotation of the nut will adjust the adjacent end of the lever L, and this adjustment can be quickly and readily effected without dismembering or displacing any of the parts of the apparatus. The engagement of the lever with the shank and holding-nut operates to lock both parts from rotative movement.

In Fig. 4 the shank is shown as longitudinally slotted, as at $a^\times$, in its threaded portion to receive the end of the lever, the holding-nut coöperating with the latter and with the shank, as has been described.

Having fully described my invention, what I claim as new, and desire to secure by Letters Patent, is—

1. A lever-screw having a shank threaded for a part of its length and provided with a longitudinal lever-engaging portion in such part, and a lever-holding nut coöperating with the threaded part of the shank.

2. A lever-screw having a headed shank threaded for a part of its length and provided with a longitudinal lever-engaging face in such part, and a lever-holding nut coöperating with the threaded part of the shank.

3. A lever-screw having a shank threaded for a part of its length and provided with a longitudinal lever-engaging portion in such part, and a lever-holding nut coöperating with the threaded part of the shank, and having locking means to prevent accidental rotation thereof on the shank.

4. A lever-screw having a headed shank threaded at its opposite end and provided in such latter portion with a longitudinal recess, and a lever-holding nut coöperating with the threaded portion of the shank, the lower end of the nut having one or more locking-notches.

5. The roller-beam of a spinning-frame, the stirrup-lever, a lever-screw having its shank loosely extended through a hole in the beam and threaded at its upper end, a longitudinal recess in the threaded portion to receive the end of the lever, and a lever-holding nut coöperating with the threaded part of the shank and notched on its lower end to engage the lever, and be thereby locked from rotation.

6. The roller-beam, and stirrup-lever, combined with a headed shank loosely extended through said beam, and threaded at its upper end, and a holding-nut coöperating with the threaded portion, the lever engaging the nut and the shank and preventing rotation thereof.

In testimony whereof I have signed my name to this specification in the presence of two subscribing witnesses.

HENRY A. OWEN.

Witnesses:
G. H. GOODELL,
G. B. HAMBLIN.